(12) United States Patent
Budinger et al.

(10) Patent No.: US 7,811,396 B2
(45) Date of Patent: Oct. 12, 2010

(54) METHOD FOR HVOF OR LPPS RESTORATION COATING REPAIR OF A NICKEL-BASE SUPERALLOY ARTICLE

(75) Inventors: David Edwin Budinger, Loveland, OH (US); Brent Ross Tholke, Cincinnati, OH (US); Matthew Nicklus Miller, Maineville, OH (US); Warren Davis Grossklaus, Jr., West Chester, OH (US); Joshua Leigh Miller, West Chester, OH (US); Melvin Robert Jackson, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 615 days.

(21) Appl. No.: 11/845,352

(22) Filed: Aug. 27, 2007

(65) Prior Publication Data
US 2010/0136247 A1  Jun. 3, 2010

Related U.S. Application Data

(63) Continuation of application No. 10/702,987, filed on Nov. 6, 2003, now abandoned.

(51) Int. Cl.
*C23C 10/28* (2006.01)
(52) U.S. Cl. .................. 148/527; 148/535
(58) Field of Classification Search ........... None
See application file for complete search history.

(56) References Cited

U.S. PATENT DOCUMENTS

| | | | |
|---|---|---|---|
| 5,240,491 A | 8/1993 | Budinger et al. | |
| 5,561,827 A | 10/1996 | Reeves et al. | |
| 5,732,467 A | 3/1998 | White et al. | |
| 5,956,845 A | 9/1999 | Arnold | |
| 6,233,822 B1 | 5/2001 | Grossklaus, Jr. et al. | |
| 6,383,658 B1 | 5/2002 | Carlson et al. | |
| 6,468,367 B1* | 10/2002 | Mukira et al. ............... 148/428 |
| 2003/0088980 A1 | 5/2003 | Arnold | |
| 2005/0036892 A1 | 2/2005 | Bajan | |

FOREIGN PATENT DOCUMENTS

| | | |
|---|---|---|
| EP | 0713957 A1 | 5/1996 |
| EP | 1013788 A1 | 6/2000 |
| EP | 1122329 A1 | 8/2001 |
| EP | 1507018 A1 | 2/2005 |

* cited by examiner

*Primary Examiner*—George Wyszomierski
(74) *Attorney, Agent, or Firm*—McNees Wallace & Nurick LLC

(57) ABSTRACT

A method for repairing a nickel-base superalloy article, such as a gas turbine stationary flowpath shroud having flowpath cooling holes therein that has previously been in service, includes the steps of providing the nickel-base superalloy article that has previously been in service; and applying a restoration to a surface of the article. The restoration is applied by the steps of providing a restoration nickel-base alloy, wherein the restoration nickel-base alloy preferably has no more than about 15 weight percent chromium and no more than about 0.01 percent yttrium, thereafter applying a restoration coating of the restoration nickel-base alloy to the surface of the article by a hyper-velocity oxyfuel metal spray process or a low-pressure plasma spray process, and thereafter heating the article with the restoration coating applied to the surface thereof to a sufficiently high temperature to diffusion bond the restoration coating to the surface of the article. The article is then returned to service.

13 Claims, 4 Drawing Sheets

METHOD FOR HVOF OR LPPS RESTORATION COATING REPAIR OF A NICKEL-BASE SUPERALLOY ARTICLE

CROSS-REFERENCE TO RELATED APPLICATIONS

This application is a continuation of U.S. application Ser. No. 10/702,987, abandoned, filed Nov. 6, 2003, which is hereby incorporated by reference in its entirety.

This invention relates to the repair of a nickel-base superalloy article and, more particularly, to a repair for restoring a dimension of the article.

BACKGROUND OF THE INVENTION

In an aircraft gas turbine (jet) engine, air is drawn into the front of the engine, compressed by a shaft-mounted compressor, and mixed with fuel. The mixture is combusted, and the resulting hot combustion gas is passed through a turbine mounted on the same shaft. The turbine includes a rotating turbine disk with turbine blades supported on its periphery, and a stationary (that is, not rotating) gas turbine flowpath shroud that confines the combustion gas to flow through the annulus between the turbine disk and the shroud, and thence against the turbine blades. The constrained flow of hot combustion gas turns the turbine by contacting an airfoil portion of the turbine blade, which turns the shaft and provides power to the compressor. The rotating turbine blades and the gas turbine stationary flowpath shroud are heated to high temperatures by the hot combustion gas. To aid them in withstanding the high external temperatures, they are typically cooled by flows of compressed cool air that are conducted through their interiors and exit at cooling holes in their surfaces. The hot exhaust gases flow from the back of the engine, driving it and the aircraft forward.

During service, the turbine disk, the turbine blades, and the gas turbine stationary flowpath shroud are all corroded, eroded, and oxidized by the hot combustion gas, and material is also lost by rubbing. Some of the metal of the turbine blades and the gas turbine stationary flowpath shroud is burned away, reducing the dimensions of the components below that which is acceptable for economic operation of the gas turbine engine. Rotor excursions, due to causes such as power bursts or hard landings, produce rubs between the turbine blades and the shroud that dig into the shroud. Consequently, with increasing periods of service, the clearance gap between the turbine blades and the gas turbine stationary flowpath shroud is increased. Eventually, the efficiency of the gas turbine suffers because hot combustion gas leaks through the clearance gap between the tips of the turbine blades and the gas turbine stationary flowpath shroud and does not perform work to turn the turbine blades.

When the gas turbine engine is overhauled, it is conventional practice to restore the dimensions of the components to within their original manufactured tolerances, thereby regaining the efficiency of the gas turbine. In the case of the gas turbine stationary flowpath shroud, techniques are known to conduct this repair with thermally densified coatings, see for example U.S. Pat. No. 5,561,827, whose disclosure is incorporated by reference. In this approach, a preform is prepared and bonded to the flowpath surface of the gas turbine stationary flowpath shroud, and the cooling holes are redrilled. This approach has been successful for restoring the dimensions of the gas turbine stationary flowpath shroud, and, in conjunction with techniques for restoring the turbine blades, for returning the gas turbine to its specification dimensions and thence to its original efficiencies.

However, in some instances there has been observed a preferential oxidation at the openings of the cooling holes of the gas turbine flowpath shroud, after it is returned to service. This preferential oxidation may cause the bore of the cooling holes to be significantly reduced, so that the flow of cooling air is reduced. The damage to the repaired gas turbine stationary flowpath shroud caused by the hot combustion gas during the subsequent service is consequently accelerated. Various alternative repair techniques for the gas turbine stationary flowpath shroud have been tried, but these alternatives either result in the same preferential oxidation at the cooling holes or in premature crack initiation in the restoration that is propagated into the substrate.

There is a need for a repair procedure for the gas turbine stationary flowpath shrouds that is satisfactory in restoring its dimensions, but at the same time does result in the preferential oxidation around the cooling holes and premature cracking of the restoration and substrate during service. The present invention fulfills this need, and further provides related advantages.

SUMMARY OF THE INVENTION

The present invention provides a method for repairing a nickel-base superalloy article that has previously been in service and has its dimensions reduced. The present approach is used to restore the dimensions of the article, specifically the thickness dimension in the case of the gas turbine stationary flowpath shroud, to within acceptable tolerances. The present approach is effective to build up the dimensions, but does not result in a restoration that preferentially oxidizes at the cooling holes. The restoration is also resistant to premature cracking in service. The method uses an application technique that is well established for other applications. The present approach is particularly useful where the repaired article is heated to quite high temperatures by the hot combustion gas, such as temperatures of not less than about 1800° F., and preferably not less than about 1900° F.

A method for repairing a nickel-base superalloy article comprises the steps of providing the nickel-base superalloy article that has previously been in service, and applying a restoration to a surface of the article. In the case of most interest, the article is a gas turbine stationary flowpath shroud with cooling holes in the flowpath surface. The restoration is applied by the steps of providing a restoration nickel-base alloy. The restoration nickel-base alloy preferably has no more than about 15 weight percent chromium, more preferably no more than about 12 weigh percent chromium, even more preferably no more than about 10 weight percent chromium, and most preferably from about 7 to about 8 weight percent chromium. The restoration nickel-base alloy preferably has no more than about 0.01 percent yttrium, and more preferably substantially no yttrium (i.e., no more than about 0.001 percent), thereafter applying a restoration coating of the restoration nickel-base alloy to the surface of the article by a hyper-velocity oxyfuel (HVOF) or a low-pressure plasma spray (LPPS) metal spray process, and thereafter heating the article with the restoration coating applied to the surface thereof to a sufficiently high temperature to diffusion bond the restoration coating to the surface of the article. The cooling holes are redrilled as necessary, either before or, preferably, after the heating. After this application of the restoration coating is fully completed, the article is returned to service, preferably in an application wherein the article is heated to a temperature of not less than about 1800° F., more preferably not less than about 1900° F., during service.

In a preferred embodiment, the article is Rene™ N5 alloy having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and impurities. The preferred restoration nickel-base alloy preferably has a nominal composition in weight percent of about 3.1 percent cobalt, about 7.6 percent chromium, about 0.1 percent maximum molybdenum, about 3.85 percent tungsten, about 0.02 percent maximum titanium, about 1.65 percent rhenium, about 0.55 percent silicon, about 5.45 percent tantalum, about 7.8 percent aluminum, about 0.15 percent hafnium, about 0.02 percent carbon, balance nickel and impurities. In another embodiment, the restoration nickel-base alloy has a nominal composition in weight percent of 0.01-0.03 percent carbon, 0.1 percent maximum manganese, 0.5-0.6 percent silicon, 0.01 percent maximum phosphorus, 0.004 percent maximum sulfur, 7.4-7.8 percent chromium, 2.9-3.3 percent cobalt, 0.01 percent maximum molybdenum, 3.7-4.0 percent tungsten, 5.3-5.6 percent tantalum, 0.02 percent maximum titanium, 7.6-8.0 percent aluminum, 1.5-1.8 percent rhenium, 0.005 percent maximum selenium, 0.3 percent maximum platinum, 0.01-0.02 percent boron, 0.03 percent maximum zirconium, 0.12-0.18 percent hafnium, 0.1 percent maximum niobium, 0.1 percent maximum vanadium, 0.1 percent maximum copper, 0.2 percent maximum iron, 0.0035 percent maximum magnesium, 0.01 percent maximum oxygen, 0.01 percent maximum nitrogen, balance nickel with other elements 0.5 percent maximum.

The restoration alloy that forms the restoration coating may be a nickel-base superalloy different from that of the nickel-base superalloy article. However, the restoration alloy is not necessarily a nickel-base superalloy and, if it is, the restoration alloy need not be heat treated to produce gamma prime precipitates. The purpose of the restoration coating is to restore dimensions, not primarily to provide strength although it may do so.

The restoration coating is preferably applied to a thickness of from about 0.030 to about 0.150 inches, more preferably to a thickness of from about 0.060 to about 0.100 inches.

In the step of heating to effect diffusion bonding, the article is preferably heated to a temperature of at least 1950° F., more preferably to a temperature of from about 2025° F. to about 2075° F., and most preferably to a temperature of about 2050° F. The heat treatment is preferably for a time of at least about 1 hour, more preferably for about 3½ to 4½ hours, and most preferably for about four hours.

The restoration coating is resistant to oxidation, and in particular is resistant to preferential oxidation around the cooling holes. The restoration coating is itself preferably a nickel-base superalloy that may be strengthened by the precipitation of gamma-prime phase or a related phase. This moderate strength aids in resisting any cracking of the restoration during subsequent service. The hyper-velocity oxyfuel (HVOF, also sometimes called high-velocity oxyfuel) metal spray process and the low-pressure plasma spray (LPPS) process are proven application techniques that are used in other circumstances.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
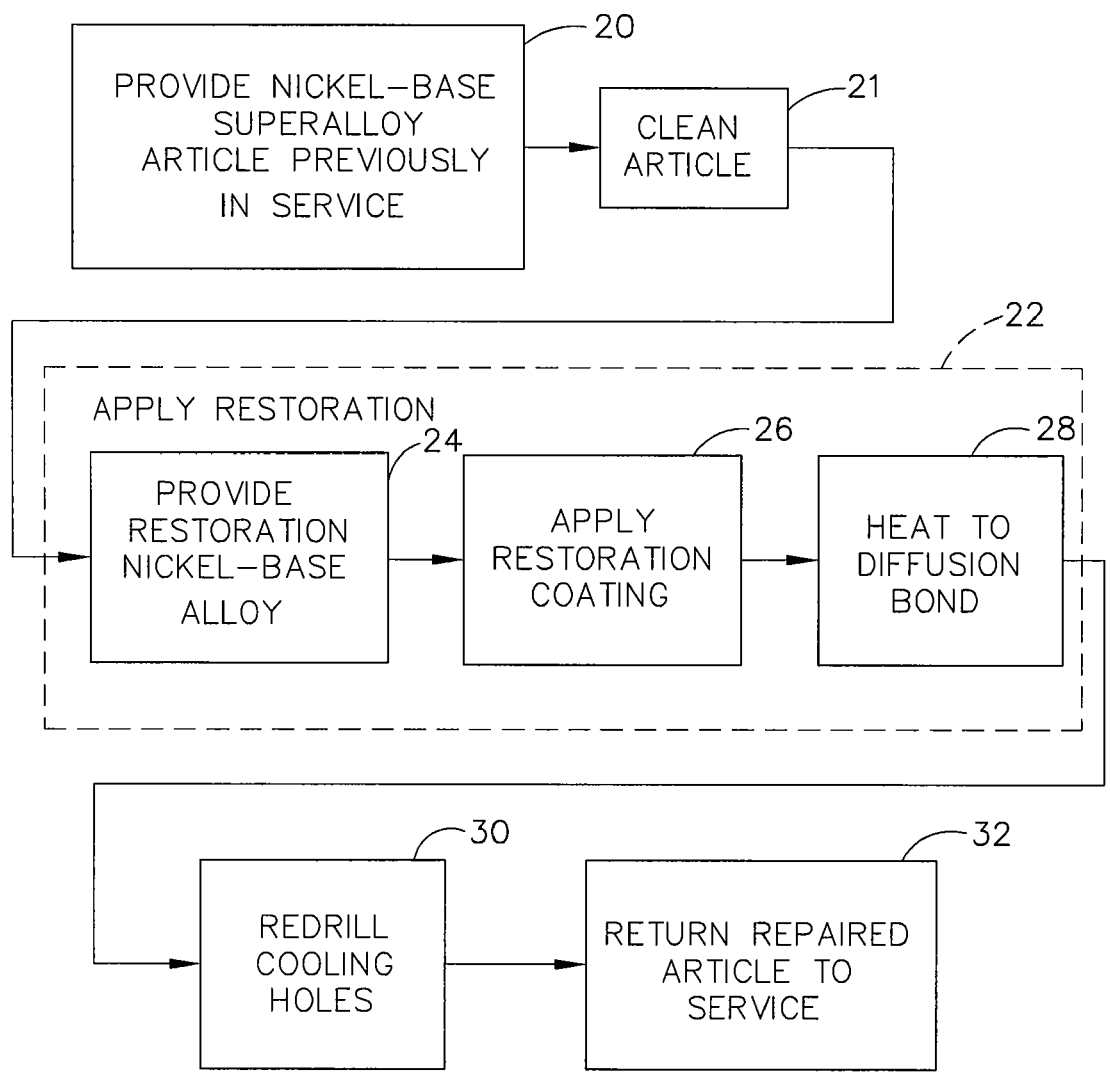
FIG. 1 is a block flow diagram of a preferred approach for practicing an embodiment of the method of the invention.

FIG. 1 depicts in block diagram form a preferred embodiment of a method for repairing a nickel-base superalloy article. In practicing the method, the nickel-base superalloy article that has previously been in service is provided, step 20. The present approach is applicable to any operable article. FIGS. 2-7 depict the use of the method in relation to a presently preferred article, a gas turbine stationary flowpath shroud.

Figure 2:
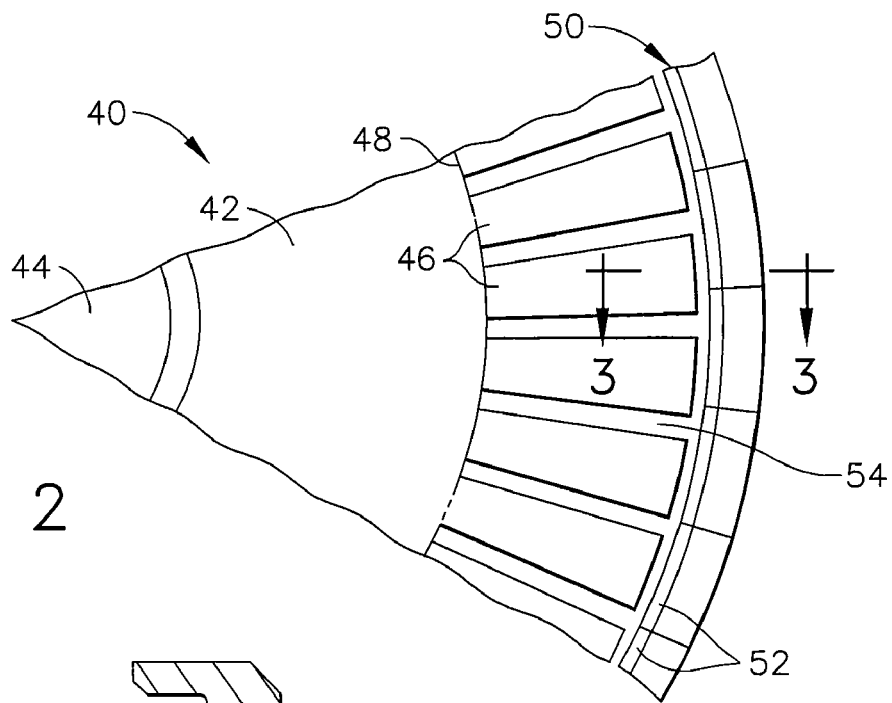
FIG. 2 is a fragmentary schematic front elevational view of a portion of a gas turbine.

FIG. 2 presents a simplified depiction of the relevant portions of a gas turbine 40 illustrating only the components of interest. The gas turbine 40 includes a turbine disk 42 that is fixed to and rotates with a center shaft 44. A plurality of turbine blades 46 extend radially outwardly from a periphery 48 of the turbine disk 42. A gas turbine stationary flowpath shroud 50 forms a tunnel-like structure in which the turbine disk 42, the shaft 44, and the turbine blades 46 turn. (The gas turbine stationary flowpath shroud 50 is termed "stationary" and does not rotate as the turbine disk 42, the shaft 44, and the turbine blades 46 rotate. The stationary gas turbine stationary flowpath shroud 50 is to be distinguished from the rotating shrouds that are found near the tips of some types of gas turbine blades.) The gas turbine stationary flowpath shroud 50 is formed by a series of stationary shroud segments 52 that together define the cylindrical gas turbine stationary flowpath shroud 50. A combustion gas flow 54 flowing from the combustors (not shown) of the gas turbine engine is perpendicular to the plane of the drawing of FIG. 2.

Figure 3:
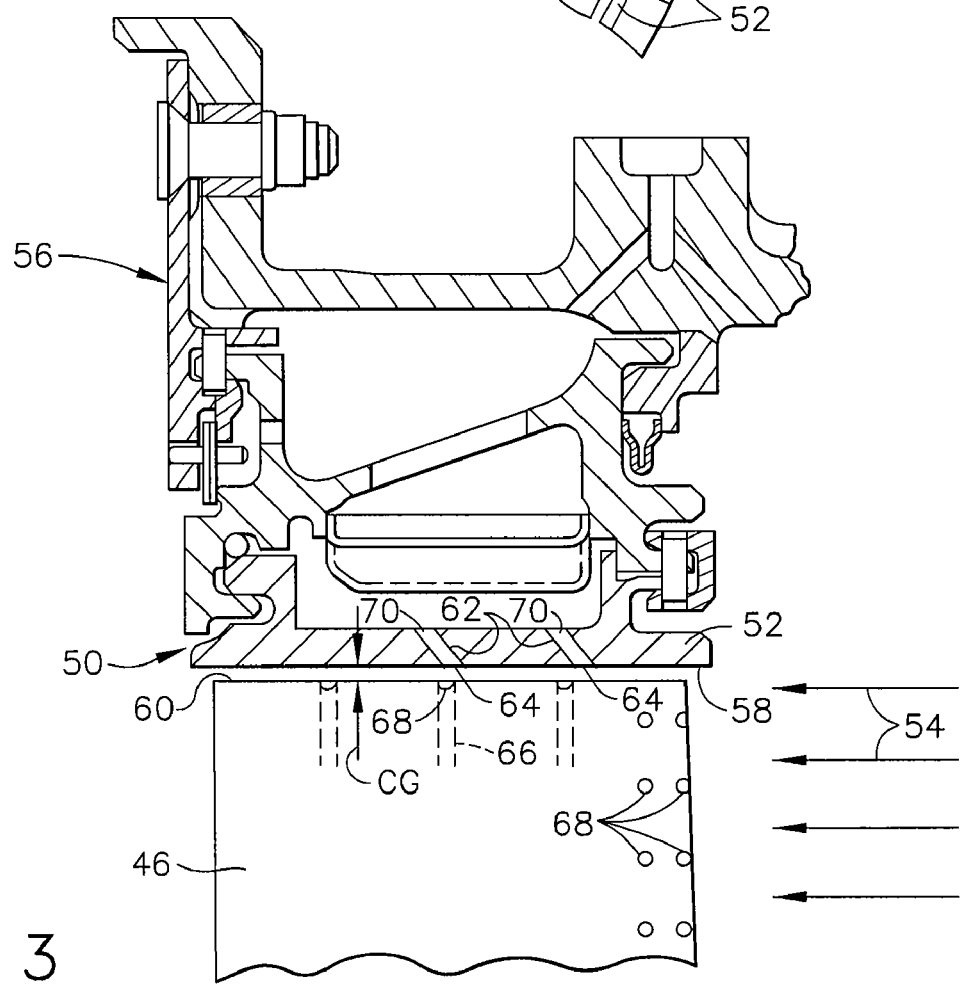
FIG. 3 is a cross-sectional view on line 3-3 of FIG. 2 of a gas turbine stationary flowpath shroud assembly and its relation to a turbine blade.

FIG. 3 illustrates the gas turbine stationary flowpath shroud 50 and one of the stationary shroud segments 52 in greater detail. Each stationary shroud segment 52 is supported on a shroud hanger structure 56. The gas turbine stationary flowpath shroud 50 and the stationary shroud segment 52 have a flowpath surface 58 that faces but is spaced apart from a tip 60 of the turbine blade 46. In the operation of the gas turbine 40, it is important that the separation of the flowpath surface 58 and the tip 60, termed the clearance gap CG, be within specified tolerance limits. During service, both the flowpath surface 58 and the tip 60 are eroded, corroded, and oxidized by the hot combustion gas 54, and occasionally rubbed together, with a consequent loss of material. The value of CG therefore increases over time, until it becomes so large that an unacceptable amount of the combustion gas flow 54 leaks between the flowpath surface 58 of the stationary flowpath shroud 50 and the tip 60, so that it does not contact the turbine blade 46 and impart energy to it. The result is the loss of efficiency of the gas turbine 40.

Figure 4:
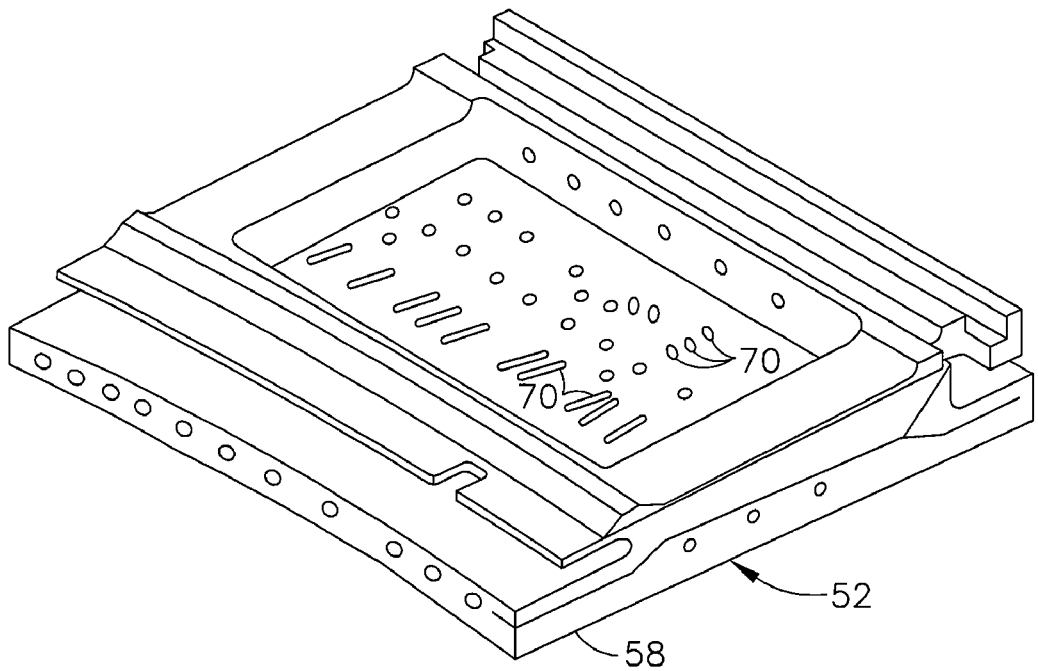
FIG. 4 is a perspective view of a segment of the gas turbine stationary flowpath shroud.
Figure 5:
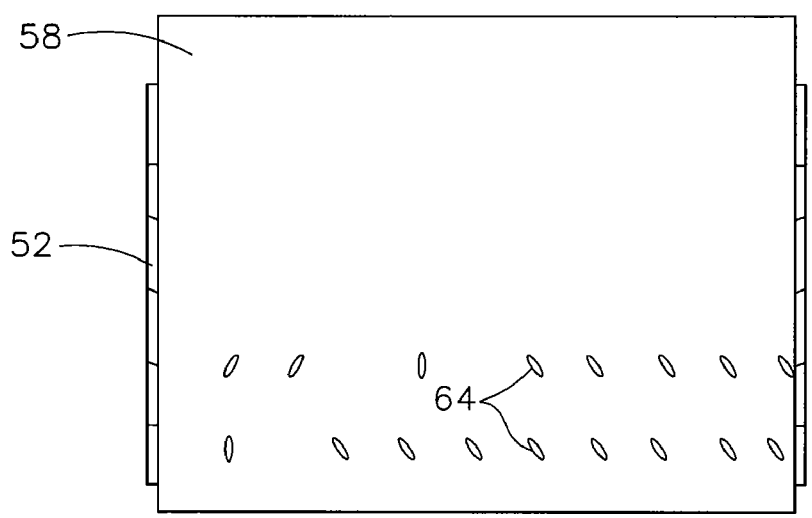
FIG. 5 is a bottom view of the gas turbine stationary flowpath shroud.
Figure 6:
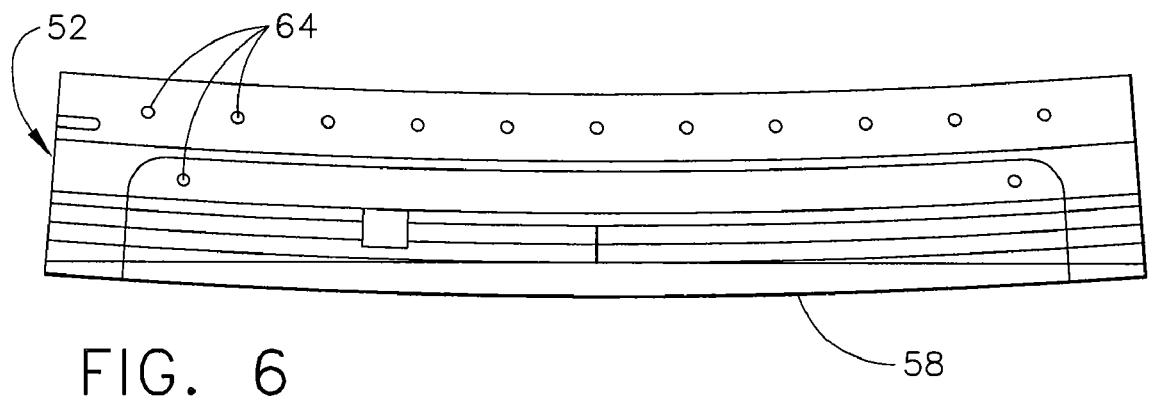
FIG. 6 is a front view of the gas turbine stationary flowpath shroud.

One technique for increasing the temperature at which the turbine blade 46 and the gas turbine stationary flowpath shroud 50 may operate is to pass a flow of a cooling gas, typically air, through their interiors. The stationary shroud segment 52 therefore has interior cooling channels 62 through which the cooling gas passes to emerge at cooling holes 64 in the flowpath surface 58. The number and pattern of the cooling holes 64 in the stationary shroud segment 52 is selected to provide the desired cooling. FIGS. 4-6 illustrate one approach to the positioning of the cooling holes 64. FIG. 4 depicts from the side opposite the flowpath surface 58 the entrance end 70 of the cooling channels 62, while FIGS. 5-6 illustrate a pattern of the cooling holes 64 from bottom (FIG. 5) and front elevational (FIG. 6) views. (The turbine blade 46 also has internal cooling channels 66 with cooling holes 68, but the present embodiment is concerned only with the stationary shroud segment 52 and not the turbine blades 42.)

The article such as the gas turbine stationary flowpath shroud 50 is most preferably made of a nickel-base superalloy. As used herein, "nickel-base" means that the composition has more nickel present than any other element. The nickel-base superalloys are of a composition that is strengthened by the precipitation of gamma-prime phase or a related phase. In a preferred case, the article is a nickel-base alloy that is also a superalloy and has a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and impurities.

The article that has previously been in service is cleaned to remove dirt, oxidation and corrosion products, and other foreign matter resulting from the prior service, step 21. The cleaning is preferably accomplished by fluoride ion cleaning.

A restoration is applied to a surface, here the flowpath surface 58, of the article, here the stationary shroud segment 52, step 22. The application step 22 first includes providing a restoration nickel-base alloy, step 24. The restoration nickel-base alloy is preferably a nickel-base superalloy that is strengthened by the precipitation of gamma prime or a related phase. The restoration nickel-base alloy preferably has no more than 15 weight percent chromium, more preferably no more than 12 weigh percent chromium, even more preferably no more than 10 weight percent chromium, and most preferably from 7 to 8 weight percent chromium. The restoration coating has no more than about 0.01 percent yttrium, and preferably substantially no yttrium (i.e., no more than about 0.001 percent). If larger amounts of chromium and yttrium are present in the restoration coating, such as 20 percent chromium and 0.07 percent yttrium, the restoration coating is operable, but there is a tendency for oxidation within the shroud cooling holes 64 that gradually plugs the cooling holes 64 and reduces the cooling air flow through them.

In a preferred embodiment, the restoration nickel-base alloy has a nominal composition in weight percent of about 3.1 percent cobalt, about 7.6 percent chromium, about 0.1 percent maximum molybdenum, about 3.85 percent tungsten, about 0.02 percent maximum titanium, about 1.65 percent rhenium, about 0.55 percent silicon, about 5.45 percent tantalum, about 7.8 percent aluminum, about 0.15 percent hafnium, about 0.02 percent carbon, balance nickel and impurities. In another embodiment, the restoration nickel-base alloy has a nominal composition in weight percent of 0.01-0.03 percent carbon, 0.1 percent maximum manganese, 0.5-0.6 percent silicon, 0.01 percent maximum phosphorus, 0.004 percent maximum sulfur, 7.4-7.8 percent chromium, 2.9-3.3 percent cobalt, 0.01 percent maximum molybdenum, 3.7-4.0 percent tungsten, 5.3-5.6 percent tantalum, 0.02 percent maximum titanium, 7.6-8.0 percent aluminum, 1.5-1.8 percent rhenium, 0.005 percent maximum selenium, 0.3 percent maximum platinum, 0.01-0.02 percent boron, 0.03 percent maximum zirconium, 0.12-0.18 percent hafnium, 0.1 percent maximum niobium, 0.1 percent maximum vanadium, 0.1 percent maximum copper, 0.2 percent maximum iron, 0.0035 percent maximum magnesium, 0.01 percent maximum oxygen, 0.01 percent maximum nitrogen, balance nickel with other elements 0.5 percent maximum.

Figure 7:
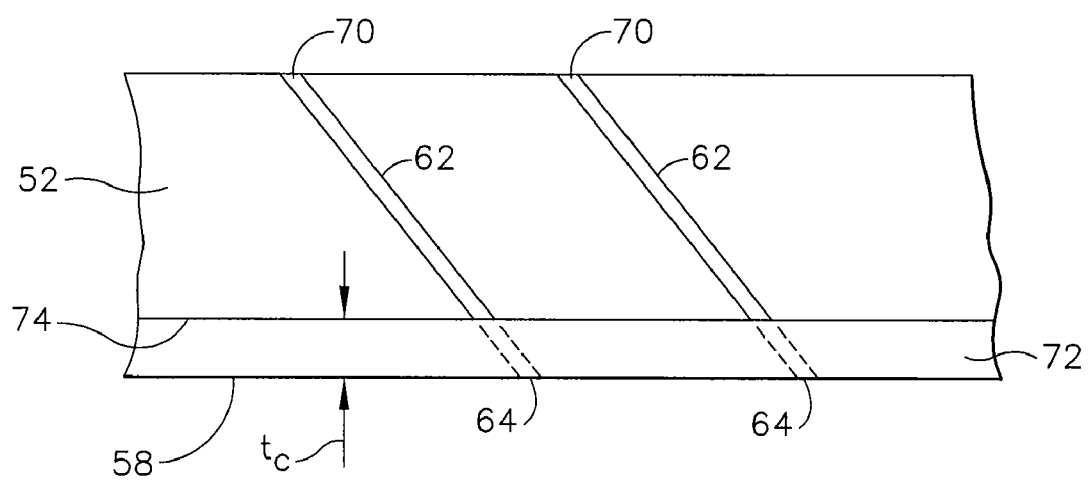
FIG. 7 is an enlarged side schematic elevational view of the gas turbine stationary flowpath shroud during the restoration process.

As seen in FIG. 7, a restoration coating 72 of the restoration nickel-base alloy is thereafter applied, step 26, to a pre-repair flowpath surface 74 by a hyper-velocity oxyfuel (HVOF) metal spray process or by a low-pressure plasma spray (LPPS) process. The preferred HVOF metal spray process is a known technique for applying metallic deposits in other contexts, see for example U.S. Pat. No. 6,233,822, whose disclosure is incorporated by reference. The LPPS process is also known in the art for other applications. The restoration coating 72 may be applied in any operable thickness $t_C$ that returns the dimensions of the article to the desired values, but it is preferably applied in a thickness of from about 0.030 to about 0.150 inches, more preferably to a thickness of from about 0.060 to about 0.100 inches.

The stationary shroud segment 52 with the restoration coating 72 applied to the pre-repair flowpath surface 74 is thereafter heated to a sufficiently high temperature to diffusion bond the restoration coating to the flowpath surface, step 28. Preferably, the stationary shroud segment and the applied restoration coating 72 are heated to a temperature of from about 2025° F. to about 2075° F. for a time of at least about 3½ hours, most preferably to about 2050° F. for about 4 hours. The exposed surface of the restoration coating 72 is the new, repaired flowpath surface 58.

The application process 22 typically overcoats the visible cooling holes with the restoration coating 72. It is therefore necessary to redrill the cooling holes, step 30. The redrilling step 30, like the originally drilling of the cooling channels 62, is preferably performed by laser drilling.

Optionally, an environmental coating may be applied to protect portions of the article. The environmental coating is typically a diffusion aluminide applied by vapor phase aluminiding (VPA), a process known in the art. Any portion of the environmental coating that deposits on the flowpath surface 58 is machined away prior to the initial operation of the engine.

After the application step 22 and redrilling step 30 are complete, the repaired article with restored dimensions is returned to service, step 32. Although the present approach may be used in relation to any service temperature at which the article is operable, it is most preferably used where the service temperature is very high, as in high-temperature gas turbines 40. Such high services temperatures are typically not less than about 1800° F., and preferably not less than about 1900° F.

Thus, an article comprises a nickel-base superalloy article that has previously been in service, and a restoration applied to a surface of the article. The restoration is made of a nickel-base superalloy different from that of the nickel-base superalloy article. The restoration nickel-base superalloy has no more than about 15 weight percent chromium and no more than about 0.01 weight percent yttrium.

The present approach has been reduced to practice using the preferred approach discussed above. High-pressure-turbine stationary shroud segments of the preferred substrate material were coated with the preferred restoration coating material. The restoration coating 72 adheres well to the substrate material after the heating step 28. The restoration coating 72 machines well in the redrilling of the cooling holes, step 30.

The restoration coating material must be resistant to oxidation and corrosion damage, and these two properties were evaluated using coated specimens prepared by the preferred approach discussed above. For the oxidation-resistance determination, individual pin samples of the preferred Rene™ N5 substrate material were (1) left uncoated as a control, (2) coated with a prior coating material that had a chromium content of 20 weight percent and a yttrium content of 0.1 weight percent and was applied by the HVOF process, and (3) coated with the preferred restoration coating material by the HVOF process. The samples were subjected to cyclic oxidation at 2075° F. maximum temperature with 0.5 mach combustion gas velocity, and a heating cycle of a rapid heat, 5 minutes at temperature, and a rapid cool for 2000 cycles. The weight after oxidation testing was compared with the weight prior to oxidation testing, to determine a weight loss. The uncoated pin had a weight loss of 0.0083 grams, the pin coated with the prior coating material had a weight loss of 0.1729 grams, and the pin coated with the present restoration coating material had a weight loss of 0.0067 grams. The present restoration coating material had better oxidation resistance than the other samples, under the relatively high-temperature testing conditions.

In the accelerated corrosion testing, individual samples of the same types as used in the oxidation testing were prepared, and uncoated pin samples were also prepared as a baseline. The pin samples were exposed at 1700° F. for 10 minutes to Mach 0.5 flowing combustion gas, then exposed to 5.4 cubic centimeters per minute of salt solution added to the Mach 0.5 flowing combustion gas, then heated to 2075° F. for 5 minutes, and then rapidly cooled. Each sample was given 200 cycles of this type. The pins were sectioned and inspected metallographically. The effective diameter loss was 0.0149 inches for the specimens prepared by the present approach, 0.0286 inches for the specimens coated with the prior coating material applied by the HVOF process, and 0.0428 inches for the uncoated specimens. The present approach yielded significantly better hot-salt corrosion performance.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for repairing a nickel-base superalloy article comprising the steps of
    providing the nickel-base superalloy article that has previously been in service in the flowpath of a gas turbine engine, the article having flowpath cooling holes therein and the article further having a flowpath surface;
    applying a restoration to the flowpath surface of the article by the steps of
        providing a restoration nickel-base superalloy different from that of the nickel-base superalloy article, thereafter
        applying a restoration coating of the restoration nickel-base superalloy to the flowpath surface of the article by a hyper-velocity oxyfuel metal spray process, the restoration coating overcoating the flowpath cooling holes, thereafter
    heating the article with the restoration coating applied to the flowpath surface thereof to a sufficiently high temperature to diffusion bond the restoration coating to the flowpath surface of the article,
    redrilling flowpath cooling holes in the overcoated flowpath surface of the article; and
    applying a diffusion aluminide environmental coating to the article and machining the diffusion aluminide environmental coating from the flowpath surface of the article,
    wherein the restoration nickel-base superalloy has a composition in weight percent of 0.01-0.03 percent carbon, 0.1 percent maximum manganese, 0.5-0.6 percent silicon, 0.01 percent maximum phosphorus, 0.004 percent maximum sulfur, 7.4-7.8 percent chromium, 2.9-3.3 percent cobalt, 0.01 percent maximum molybdenum, 3.7-4.0 percent tungsten, 5.3-5.6 percent tantalum, 0.02 percent maximum titanium, 7.6-8.0 percent aluminum, 1.5-1.8 percent rhenium, 0.005 percent maximum selenium, 0.3 percent maximum platinum, 0.01-0.02 percent boron, 0.03 percent maximum zirconium, 0.12-0.18 percent hafnium, 0.1 percent maximum niobium, 0.1 percent maximum vanadium, 0.1 percent maximum copper, 0.2 percent maximum iron, 0.0035 percent maximum magnesium, 0.01 percent maximum oxygen, 0.01 percent maximum nitrogen, balance nickel with other elements 0.5 percent maximum.

2. The method of claim 1, including an additional step, after the step of applying the diffusion aluminide environmental coating is fully completed, of
    returning the article to service.

3. The method of claim 1, including an additional step, after the step of applying the diffusion aluminide environmental coating is fully completed, of
    returning the article to service, wherein the article is heated to a temperature of not less than about 1800° F. during service.

4. The method of claim 1, wherein the step of providing the nickel-base superalloy article includes the step of
    providing a gas turbine stationary flowpath shroud as the article.

5. The method of claim 1, wherein the step of providing the nickel-base superalloy article includes the step of
    providing the article having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and impurities.

6. The method of claim 1, wherein the step of applying the restoration coating includes the step of
    applying the restoration coating to a thickness of from about 0.030 to about 0.150 inches.

7. The method of claim 1, wherein the step of heating includes the step of
    heating the article to a temperature of from about 2025° F. to about 2075° F.

8. The method of claim 1, wherein the step of heating includes the step of
    heating the article to a temperature of from about 2025° F. to about 2075° F. for a time of at least about 3½ hours.

9. A method for repairing a nickel-base superalloy article comprising the steps of
providing the nickel-base superalloy article comprising a gas turbine stationary flowpath shroud having flowpath cooling holes therein that has previously been in service, wherein the article has a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and impurities; and
applying a restoration to a surface of the article by the steps of
providing a restoration nickel-base alloy, wherein the restoration nickel-base alloy has a nominal composition in weight percent of about 3.1 percent cobalt, about 7.6 percent chromium, about 0.1 percent maximum molybdenum, about 3.85 percent tungsten, about 0.02 percent maximum titanium, about 1.65 percent rhenium, about 0.55 percent silicon, about 5.45 percent tantalum, about 7.8 percent aluminum, about 0.15 percent hafnium, about 0.02 percent carbon, balance nickel and impurities, thereafter
applying a restoration coating of the restoration nickel-base alloy to a flowpath surface of the article by a hyper-velocity oxyfuel metal spray process or a low-pressure plasma spray process, thereby overcoating flowpath cooling holes of the article, and thereafter
heating the article with the restoration coating applied to the flowpath surface thereof to a temperature of about 2050° F. to diffusion bond the restoration coating to the flowpath surface of the article, prior to returning the article to service,
redrilling flowpath cooling holes in the overcoated flowpath surface of the article; and
applying a diffusion aluminide environmental coating to the article and machining the diffusion aluminide environmental coating from the flowpath surface of the article.

10. The method of claim 9, including an additional step, after the step of applying the diffusion aluminide environmental coating is fully completed, of
returning the article to service.

11. The method of claim 9, including an additional step, after the step of applying the diffusion aluminide environmental coating is fully completed, of
returning the article to service, wherein the article is heated to a temperature of not less than about 1800° F. during service.

12. The method of claim 9, wherein the step of applying the restoration coating includes the step of
applying the restoration coating to a thickness of from about 0.030 to about 0.150 inches.

13. A method for repairing a nickel-base superalloy article comprising the steps of
providing the nickel-base superalloy article that has previously been in service, wherein the article is a gas turbine stationary flowpath shroud having flowpath cooling holes therein;
applying a restoration to a surface of the article by the steps of
providing a restoration nickel-base alloy, thereafter
applying a restoration coating of the restoration nickel-base alloy to the surface of the article by a hyper-velocity oxyfuel metal spray process or a low-pressure plasma spray process thereby overcoating flowpath cooling holes of the article, and thereafter
heating the article with the restoration coating applied to the surface thereof to a sufficiently high temperature to diffusion bond the restoration coating to the surface of the article; and
redrilling the cooling holes in the overcoated surface of the article,
wherein the restoration nickel-base alloy has a composition in weight percent of 0.01-0.03 percent carbon, 0.1 percent maximum manganese, 0.5-0.6 percent silicon, 0.01 percent maximum phosphorus, 0.004 percent maximum sulfur, 7.4-7.8 percent chromium, 2.9-3.3 percent cobalt, 0.01 percent maximum molybdenum, 3.7-4.0 percent tungsten, 5.3-5.6 percent tantalum, 0.02 percent maximum titanium, 7.6-8.0 percent aluminum, 1.5-1.8 percent rhenium, 0.005 percent maximum selenium, 0.3 percent maximum platinum, 0.01-0.02 percent boron, 0.03 percent maximum zirconium, 0.12-0.18 percent hafnium, 0.1 percent maximum niobium, 0.1 percent maximum vanadium, 0.1 percent maximum copper, 0.2 percent maximum iron, 0.0035 percent maximum magnesium, 0.01 percent maximum oxygen, 0.01 percent maximum nitrogen, balance nickel with other elements 0.5 percent maximum.

* * * * *